(12) United States Patent
McClure

(10) Patent No.: US 7,657,985 B2
(45) Date of Patent: Feb. 9, 2010

(54) MODIFIED BOILER WALL TUBE TOOL

(76) Inventor: Mark W. McClure, R.R. 7 Box 227, South Charleston, WV (US) 25309

( * ) Notice: Subject to any disclaimer, the term of this patent is extended or adjusted under 35 U.S.C. 154(b) by 430 days.

(21) Appl. No.: 11/370,686

(22) Filed: Mar. 8, 2006

(65) Prior Publication Data

US 2007/0209181 A1 Sep. 13, 2007

(51) Int. Cl.
*F16L 3/00* (2006.01)
(52) U.S. Cl. .................... 29/271; 29/272; 248/68.1
(58) Field of Classification Search ............ 29/890.051, 29/726.5, 525.01, 525.02, 525.11, 271, 272, 29/281.6; 248/68.1, 67.5, 74.2; 269/43, 269/152, 153, 154, 269, 270
See application file for complete search history.

(56) References Cited

U.S. PATENT DOCUMENTS

| | | | |
|---|---|---|---|
| 544,501 A | 8/1895 | Buffinton | |
| 2,367,552 A | 1/1945 | Ahrndt | |
| 2,612,821 A | 10/1952 | Skay | |
| 2,963,679 A | 12/1960 | Jugle | |
| 3,856,244 A * | 12/1974 | Menshen | 248/67.5 |
| 4,846,391 A | 7/1989 | McClure | |
| 4,936,500 A | 6/1990 | McClure | |
| 4,979,294 A | 12/1990 | Bowman et al. | |
| 5,044,075 A | 9/1991 | Brennan | |
| 5,083,372 A | 1/1992 | Polutnik | |
| 5,481,793 A | 1/1996 | McClure | |
| 5,893,209 A | 4/1999 | Weeks | |
| 5,974,642 A | 11/1999 | Weeks | |
| 5,992,802 A * | 11/1999 | Campbell | 248/68.1 |
| 5,996,945 A * | 12/1999 | Coles et al. | 248/68.1 |
| 6,007,029 A | 12/1999 | Barringer et al. | |
| 6,182,354 B1 | 2/2001 | Weeks | |
| 6,308,921 B1 | 10/2001 | Borzucki | |
| 6,322,034 B1 * | 11/2001 | O'Malley | 248/346.02 |
| 6,385,841 B1 | 5/2002 | Weeks | |
| 6,783,101 B2 * | 8/2004 | Knotts | 248/68.1 |
| 6,997,330 B2 * | 2/2006 | Pachao-Morbitzer et al. | 211/59.4 |
| 7,089,887 B1 | 8/2006 | McClure | |
| 2007/0210498 A1 | 9/2007 | McClure | |
| 2007/0296133 A1 | 12/2007 | McClure | |

OTHER PUBLICATIONS

USPTO, First Office Action for U.S. Appl. No. 11/370,713 (McClure, Mark), Mailed by USPTO on May 8, 2007, 9 pages, USA.
USPTO, Second (Final) Office Action for U.S. Appl. No. 11/370,713 (McClure, Mark), Mailed by USPTO on Jul. 18, 2008, 8 pages, USA.

* cited by examiner

*Primary Examiner*—Jermie E Cozart
(74) *Attorney, Agent, or Firm*—Robert R. Waters; Brian W. Foxworthy

(57) ABSTRACT

A boiler wall tube tool has a first clamp member positioned about one side of the boiler wall and a second clamp member positioned about the opposite side of the boiler wall. The first clamp member has recess or recesses, each recess receiving one of the tubes therein. The second clamp member has a radius or radiuses abutting against the opposite side of a tube or the tubes. The first clamp member and the second clamp member are coupled to one another about the tube or tubes through slots formed in the first clamp member and the second clamp member.

13 Claims, 6 Drawing Sheets

MODIFIED BOILER WALL TUBE TOOL

RELATED U.S. APPLICATION DATA

Not applicable.

FIELD OF THE INVENTION

This invention relates generally to a tool for use in securing the ends of a boiler tubes along a boiler wall in aligned relation so that the ends of the tubes may be joined via welding. Specifically, this invention relates to a modified boiler wall tube tool in which boiler tubes in the form of a wall can be clampingly secured to retain adjacent ends of the boiler tubes forming the wall in aligned relation when connection the ends of the boiler wall tubes by welding.

BACKGROUND OF THE INVENTION

Tools for clamping and aligning boiler tubes when connecting the ends of the boiler tubes by welding are known as disclosed in U.S. Pat. Nos. 4,493,139, 4,579,272 and 4,722,468. The devices disclosed in the above-mentioned patents include structures for securing boiler tube ends in aligned and adjacent relation and function effectively when the boiler tubes are in spaced relation. However, in boiler wall tubes, the boiler tubes are positioned in closely spaced relation and are interconnected by webs to form a continuous boiler tube sheet or wall. The tools disclosed in the above-mentioned patents are not especially adapted for use with boiler tubes forming a boiler wall.

In addition, U.S. Pat. Nos. 4,846,391 and 4,936,500, both issued to Gary McClure, discloses various embodiments of boiler wall tube tools that clampingly engage the respective tubes to facilitate welding in the repair of a wall rube or tubes. The '391 patent discloses a boiler wall tube tool having a pair of opposed clamp members that includes a pair of recesses to engage adjacent ends of a pair of boiler wall tubes on the opposite sides of a juncture between adjacent ends. The tool includes means for moving the clamps toward on another, thereby generating a secure clamp engagement between the clamps onto the respective tube or tubes. Moving means is described as a handle and a mounting bar that is inserted through each of the clamps. The '500 patent is a variation of the '391 patent in some respects, and specifically discloses a boiler wall tube tool that is bolted directly onto the boiler tube wall as opposed to utilizing a handle and mounting bar combination disclosed in '391. The embodiments disclosed herein provide the user with the ability to use the invention on variously sized/dimensioned tubes and allows for greater access to the weld site, increasing the ease and efficiency of welding of boiler tubes in the field.

Other prior art considered relevant to the present invention includes U.S. Pat. No. 5,481,793 (also issued to Gary McClure), U.S. Pat. No. 2,612,821 (issued to Skay), U.S. Pat. No. 6,007,029 (issued to Barringer et al.), U.S. Pat. No. 5,083,372 (issued to Polutnik), U.S. Pat. No. 5,044,075 (issued to Brennan et al.), U.S. Pat. No. 4,979,294 (issued to Bowman et al.), U.S. Pat. No. 6,308,921 (issued to Borzucki), and the group of U.S. Pat. Nos. 5,893,209, 5,974,642, 6,182,354 and 6,385,841 (all issued to Weeks).

SUMMARY OF THE INVENTION

In one embodiment of the invention, a boiler wall tube tool comprises a first clamp member having a pair of recesses engaging a pair of boiler wall tubes and a pair of recesses formed in the sides of the first clamp member providing access to the periphery of the boiler wall tubes. The tool also includes a second clamp member having a first radius opposite to a second radius, with the radiuses having different dimensions. The tool also includes means for securing the first clamp member and the second clamp member to the boiler wall tubes. The first clamp member and the second clamp member each have a slot formed for receiving means therethrough for securing the first clamp member and the second clamp member to the boiler wall tubes. Means is envisioned as including a threaded bolt, and may also include a free or floating nut secured to the free end of the bolt.

In another embodiment of the invention, a boiler wall tube tool comprises a first clamp member having a front and a rear. A first pair of recesses is formed at the front and a second pair of recesses are formed at the rear, wherein one pair of the recesses engages a pair of boiler wall tubes, while the opposing pair of recesses are exposed and facing outwardly. The tool also includes a pair of recesses formed in the sides of the first clamp member providing access to the periphery of the boiler wall tubes. The tool further includes a second clamp member, and means for securing the first clamp member and the second clamp member to the boiler wall tubes. The first clamp member and the second clamp member each have a slot formed for receiving means therethrough for securing the first clamp member and the second clamp member to the boiler wall tubes. Means is envisioned as including a threaded bolt, and may also include a free or floating nut secured to the free end of the bolt. The first clamp member is reversible so as to take advantage of the one pair of recesses having varied dimensions relative to the other pair of recesses, and thus expand the versatility of the first clamp member. The second clamp member is also reversible for similar reasons.

In another embodiment of the invention, the boiler wall tube tool comprises a first clamp member having a recess engaging a boiler wall tube, and a pair of recesses formed in the sides of the first clamp member providing access to the periphery of the boiler wall tubes. The tool also includes a second clamp member and a third clamp member. Second clamp member and third clamp member each have a first radius opposite to a second radius, with the radiuses having different dimensions. Both the second clamp member and the third clamp member are separately reversible to accommodate variously sized tubes. The tool also includes means for securing the first clamp member to one side of the boiler wall tubes and securing the second clamp member and the third clamp member to the opposite side of the boiler wall tubes. Means is envisioned as including a threaded bolt, and may also include a free or floating nut secured to the free end of the bolt.

As discussed above, the method and device of the invention overcomes the disadvantages inherent in prior art methods and devices. In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Accordingly, those skilled in the art will appreciate that the conception upon which this invention is based may readily be utilized as a basis for the design of other structures, methods, and systems for carrying out the several purposes of the present invention. It is important, therefore, that the claims be regarded as including such equivalent constructions insofar as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application, nor is it intended to be limiting to the scope of the invention in any way. It is intended that the application is defined by the claims.

BRIEF DESCRIPTION OF THE DRAWINGS

Additional utility and features of the invention will become more fully apparent to those skilled in the art by reference to the following drawings, which illustrate the primary features of the preferred embodiment and numerous alternative embodiments.

DETAILED DESCRIPTION OF THE PREFERRED EMBODIMENT

The detailed description below is intended to provide examples of the invention through multiple embodiments disclosed herein. It is to be understood that a variety of other arrangements are also possible without departing from the spirit and scope of the invention as described and claimed.

Figure 1:
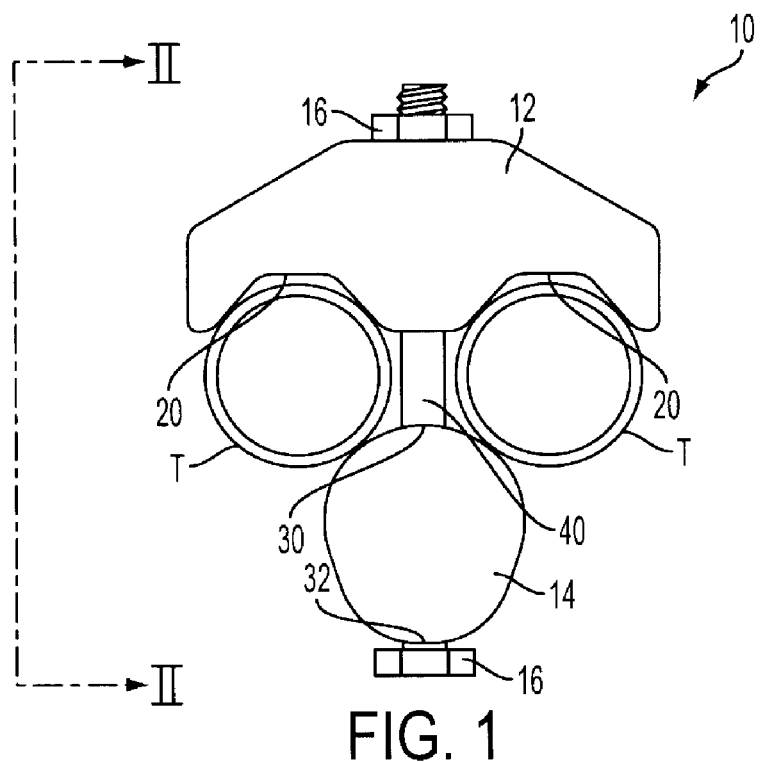
FIG. 1 is a top view of the tool in accordance with one embodiment of the present invention.
Figure 3:
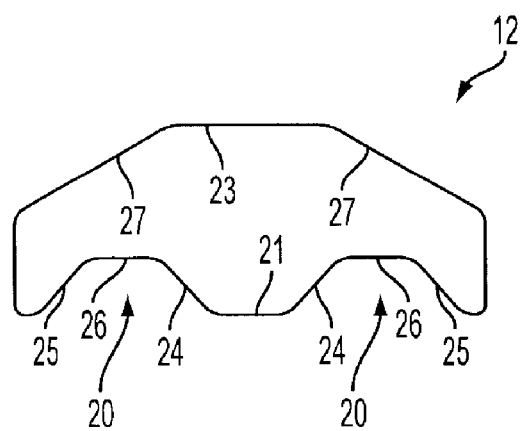
FIG. 3 is a top view of the first clamp member of the tool depicted in FIG. 1.
Figure 2:
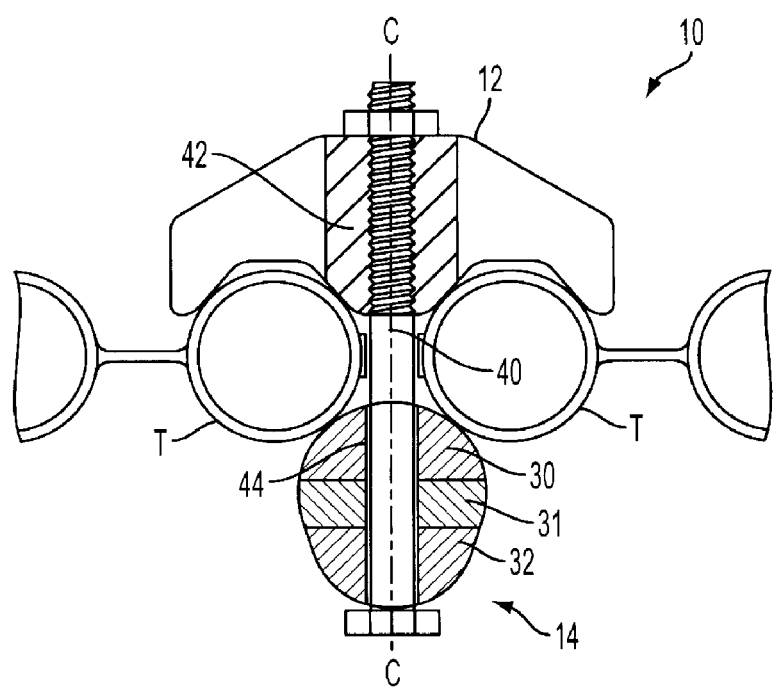
FIG. 2 is a sectional view of FIG. 1 taken along line II-II.
Figure 4:
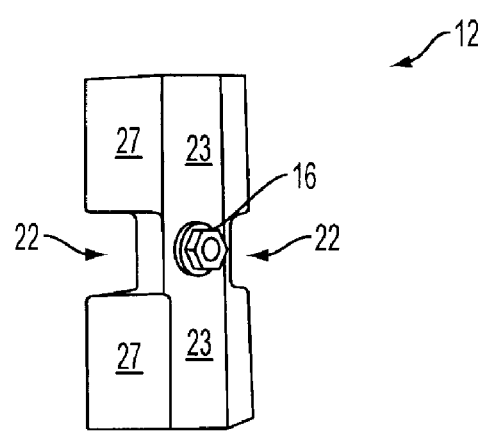
FIG. 4 is a perspective view of the rear of the tool of FIG. 1.

Referring now to FIG. 1 through FIG. 4, a boiler wall tube tool 10 (hereinafter "tool") is depicted in accordance with one embodiment of the invention. The tool 10 generally comprises a first clamp member 12, a second clamp member 14 and means for securing the first clamp member 12 and the second clamp member to the boiler wall tubes "T". In particular, the tool 10 comprises a first clamp member 12 having a pair of recesses 20 engaging a pair of boiler wall tubes "T" and a pair of recesses 22 formed in the sides of the first clamp member 12 providing access to the periphery of the boiler wall tubes "T". The tool 10 also includes a second clamp member 14 having a first radius 30 opposite to a second radius 32, the radiuses 30 and 32 having different dimensions. The tool 10 also includes means 16 for securing the first clamp member 12 and the second clamp member 14 to the boiler wall tubes on opposite sides thereof. Means 16 penetrates through an opening 200 formed in between adjacent tubes along the boiler wall, as depicted in FIG. 2. The opening 200 is used and implied to exist throughout the description of this and the other embodiments described below, especially in relation to means 56 and means 108, respectively, as described in greater detail below.

Specifically, the first clamp member 12 has a length (longitudinal) longer than the width (lateral). Along the front or face of the first clamp member 12, the recesses 20 are oriented parallel to the length of the first clamp member 12, with the recesses 20 present along the length of the first clamp member 12 except for the interruption due to the presence of the pair of recesses 22 formed in the side of the first clamp member 12. As such, and at these positions, only a portion of the recesses 20 are present, that being the inner inclined surface of the recesses 20. A flat frontal surface 21 is formed and disposed intermediately to the inner inclined surface 24 of the recesses 20, the flat frontal surface 21 operating as a ridge or rib separating the respective recesses 20. The flat frontal surface 21 is parallel to a flat rear surface 23. The surfaces 21 and 23 are separated by the thickness of the first clamp member 12. Each recess 20 comprises an inner inclined surface 24, an outer inclined surface 25 and a flat surface 26 intermediately disposed to surfaces 24 and 25.

Substantially opposite to the recesses 20 formed at the front of the first clamp member 12, outer inclined surfaces 27 extend from the flat rear surface 23 to the margins of the first clamp member 12. In cross section and looking from above or below the first clamp member 12, the first clamp member 12 has an appearance similar to the shape of a modified version of the capital letter "E". If the first clamp member 12 is rotated, so that one is viewing the rear of the member 12, as the outer inclined surfaces 27 are oriented substantially similar to the recesses 20, the outer inclined surfaces 27 are also interrupted by the recesses 22 formed in the side of the first clamp member 12.

The radiuses 30 and 32 of the second clamp member 14 are arranged so that radius 30 has a larger dimension than radius 32. It is envisioned that the normal positioning of the second clamp member 14 is such that the radius 30 engages the boiler wall tube and radius 32 is exposed. In this arrangement, it is envisioned that radius 30 has the larger dimension compared to radius 32. The second clamp member 14 may be described as having a radius 30, a radius 32 and a length, distance or width 31 intermediately disposed between the radiuses 30 and 32, respectively. This arrangement provides maximum exposure of the boiler wall tubes "T". However, it is also envisioned that the second clamp member 14 is reversible so that radius 32 engages the boiler wall tube and the radius 30 is expose, and thus, the larger radius 30 is exposed and minimizing the area of exposure of the boiler wall tubes "T". Alternatively, such an arrangement may be necessary to accommodate boiler wall tubes "T" having a smaller diameter or for imperfections that may render using the larger radius 30 ineffective or impracticable.

Means 16 is envisioned as comprising a threaded bolt 40 inserted through a slot 42 formed in the first clamp member 12 and a slot 44 formed in the second clamp member 14. The slots 42 and 44 are substantially aligned concentric about an imaginary axis C-C. As depicted and envisioned in one embodiment, the slots 42 and 44 are formed approximately in the center of each respective clamp member 12 and 14. In particular, the slot 42 formed on the first clamp member 12 is positioned universally center of the recesses 22 formed on the sides of the first clamp member 12. It is also envisioned that the diameter of the slots 42 and 44, respectively, are greater than the diameter of the threaded bolt 40. The additional dimension of the slots 42 and 44 allows for the slight offset of one slot 42 relative to the other slot 44 (or vice versa) so that the threaded bolt 40 does not have to align perpendicular to the boiler wall tubes "T", thereby allowing for imperfections in the boiler wall tubes "T" or variations in dimension from one wall tube to another wall tube. The threaded bolt 40 may be secured by corresponding threads placed into the slots 42 and/or 44. Likewise, the threaded bolt 40 may be secured by the placement of a floating or stationary nut 46 at the end of the bolt 40.

Figure 5:
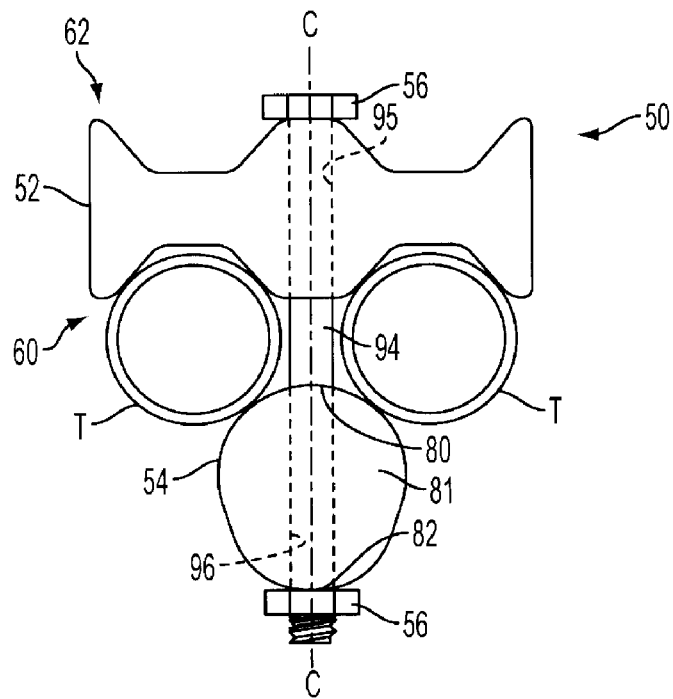
FIG. 5 is a top view of an alternate embodiment of the tool.
Figure 6:
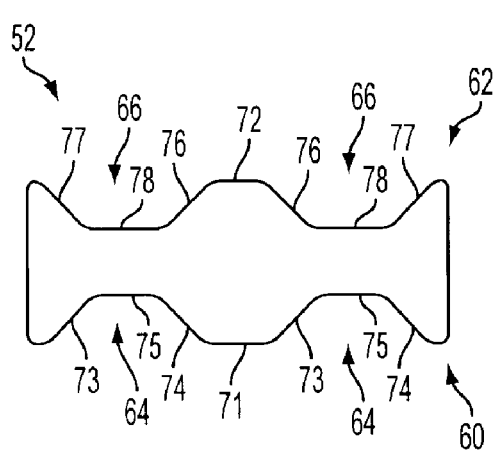
FIG. 6 is a top view of the first clamp member of the tool depicted in FIG. 5.
Figure 7:
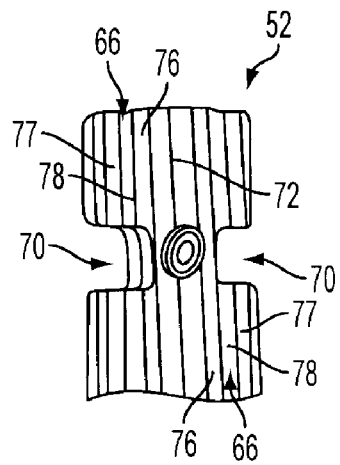
FIG. 7 is a perspective view of the alternate embodiment depicted in FIG. 5.

In another embodiment of the invention, and specifically referring to FIG. 5 through FIG. 7, the tool 50 generally comprises a reversible first clamp member 52, having recesses on its front and rear, a second clamp member 54, and means 56 for securing the clamp members 52 and 54 to the boiler wall tubes "T". In particular, the tool 50 comprises a first clamp member 52 having a front 60 and a rear 62. A first pair of recesses 64 is formed at the front 60 and a second pair of recesses 66 is formed at the rear 62. The first clamp member 52 is arranged and oriented so that one pair of the recesses 64 or 66 engage a pair of boiler wall tubes "T", while the other opposing pair of the recesses 64 or 66 is oriented so as to face away from the boiler wall tubes "T". The tool 50 also includes a pair of recesses 70 formed in the sides of the first clamp member 52 providing access to the periphery of the boiler wall tubes "T". The tool 50 has a second clamp member 54. The tool 50 also includes means 56 for securing the first clamp member 52 and the second clamp member 54 to the boiler wall tubes "T".

The first clamp member 52 has a front 60 side and a rear 62 side. A first pair of recesses 64 is formed at the front 60 side having substantially the same appearance and configuration as that described above in relation to the recesses 20 of the first clamp member 12. On the opposing side, the rear 62 side, a second pair of recesses 66 is formed having a similar appearance as the recesses 64 formed at the front 60 side. However, the recesses 64 are different in dimension from the recesses 66, so that recesses 64 accommodate a range of diameters for a boiler wall tube, and the recesses 66 accommodate a larger or smaller range of diameters for a boiler wall tube "T". Thus, the first clamp member 52 may be reversible so as accommodate a variety of boiler wall tube diameters.

In greater detail, the recesses 64 are oriented parallel along the length of the first clamp member 52 except for the interruption due to the presence of the pair of recesses 70 formed in the side of the first clamp member 52. As such, and at these positions, only a portion of the recesses 64 are present, that being the inner inclined surface of the recesses 64. A flat frontal surface 71 is formed and disposed intermediately to the inner inclined surfaces 73 of the recesses 64, the flat frontal surface 71 operating as a ridge or rib separating the respective recesses 64. The flat frontal surface 71 is parallel to a flat rear surface 72, which is formed substantially similar to that of the flat frontal surface 71. The flat frontal surface 71 and the flat rear surface 72 differ only in length as determined by the respective dimensions of the recesses 64 along the front 60 and the recesses 66 along the rear 62. The surfaces 71 and 72 are separated by the thickness of the first clamp member 52. Each recess 64 comprises an inner inclined surface 73, an outer inclined surface 74 and a flat surface 75 intermediately disposed to surfaces 73 and 74. Likewise, each recess 66 comprises an inner inclined surface 76, an outer inclined surface 77 and a flat surface 78 intermediately disposed to surfaces 76 and 77. As depicted in FIG. 5 and FIG. 6, the recesses 64 each have a smaller dimension than the recesses 66, and results in the length of flat frontal surface 71 being slightly longer than the flat rear surface 72.

Figure 8:
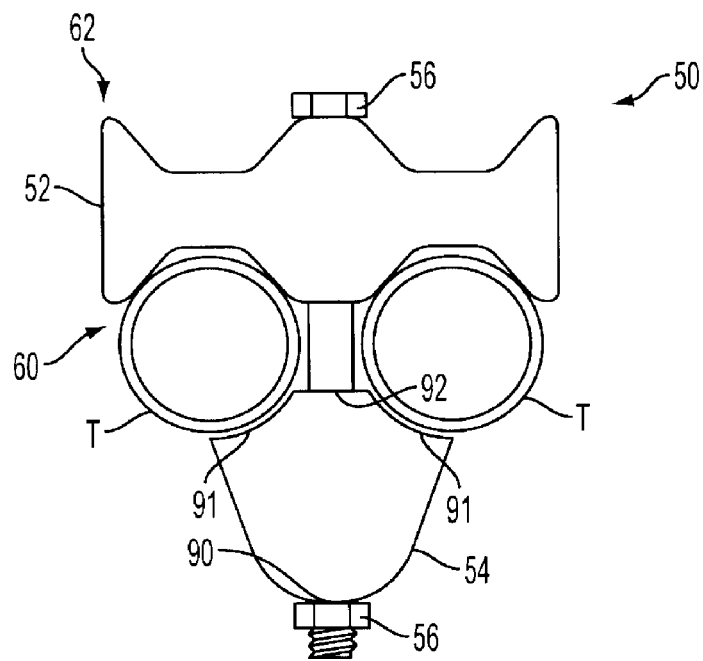
FIG. 8 is a top view of another alternate embodiment of the tool.
Figure 9:
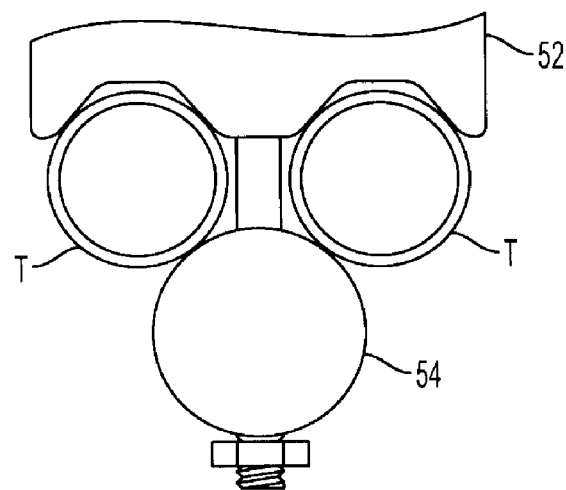
FIG. 9 is a top view of another alternate embodiment of the tool.

In this embodiment, the second clamp member 54 may have a variety of shapes and forms, including those depicted in FIG. 5, FIG. 8 and FIG. 9, respectively. In FIG. 5, the second clamp member 54 is similar to the second clamp member 14 described above relative to FIG. 1 through FIG. 4. The second clamp member 54 thus has a first radius 80 opposite to a second radius 82, the radiuses 80 and 82 having different dimensions. The radiuses 80 and 82 of the second clamp member 14 are arranged so that radius 80 has a larger dimension than radius 82. It is envisioned that the normal positioning of the second clamp member 54 is such that the radius 80 engages the boiler wall tube and radius 82 is exposed. The second clamp member 54 may be specifically described a shaving a radius 80, a radius 82 and a length, distance or width 81 intermediately disposed between the radiuses 80 and 82, respectively. This arrangement provides maximum exposure of the boiler wall tubes "T". Alternatively, it is also envisioned that the second clamp member 54 is reversible so that radius 82 engages the boiler wall tube and the radius 80 is expose, and thus, the larger radius 80 is exposed and minimizing the area of exposure of the boiler wall tubes "T". However, such an arrangement may be necessary to accommodate boiler wall tubes "T" having a smaller diameter or for imperfections that may render using the larger radius 80 ineffective or impracticable.

As described in FIG. 8, the second clamp member 54 may have a bell-shaped form having a radius 90 at one portion and a pair of indentations 91 formed at an opposite portion, with a ridge 92 separating the indentations 91. The outer margins of the respective indentations 91 provide greater surface area in which to contact the respective boiler wall tubes "T". It is further envisioned that the second clamp member 54 is reversible so that the radius 90 engages the boiler wall tubes "T". Reversing the second clamp member 54 may be necessitated by boiler wall tubes "T" exceeding the effective width of the indentations 91. Another alternate embodiment of the second clamp member 54 is depicted in FIG. 9, wherein the second clamp member 54 has a substantially spherical form with a continuous radius.

Means 56 is envisioned as comprising a threaded bolt 94 inserted through a slot 95 formed in the first clamp member 52 and a slot 96 formed in the second clamp member 54. The slots 95 and 96 are substantially aligned concentric about an imaginary axis C-C. As depicted and envisioned in one embodiment, the slots 95 and 96 are formed approximately in the center of each respective clamp member 52 and 54. In particular, the slot 95 formed on the first clamp member 52 is positioned universally center of the recesses 70 formed on the sides of the first clamp member 52. It is also envisioned that the diameter of the slots 95 and 96, respectively, are greater than the diameter of the threaded bolt 94. The additional dimension of the slots 95 and 96 allows for the slight offset of one slot 95 or 96 relative to the other slot 95 or 96 so that the threaded bolt 94 does not have to align perpendicular to the boiler wall tubes "T", thereby allowing for imperfections in the boiler wall tubes "T" or variations in dimension from one wall tube to another wall tube.

Figure 10:
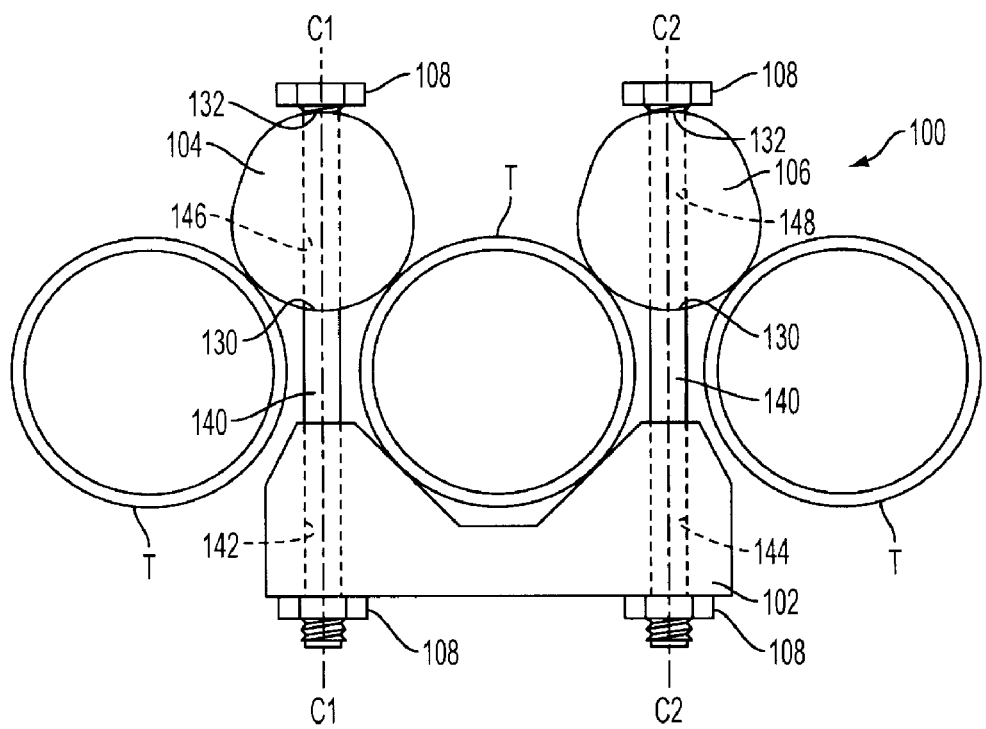
FIG. 10 is a top view of another alternate embodiment of the tool.
Figure 11:
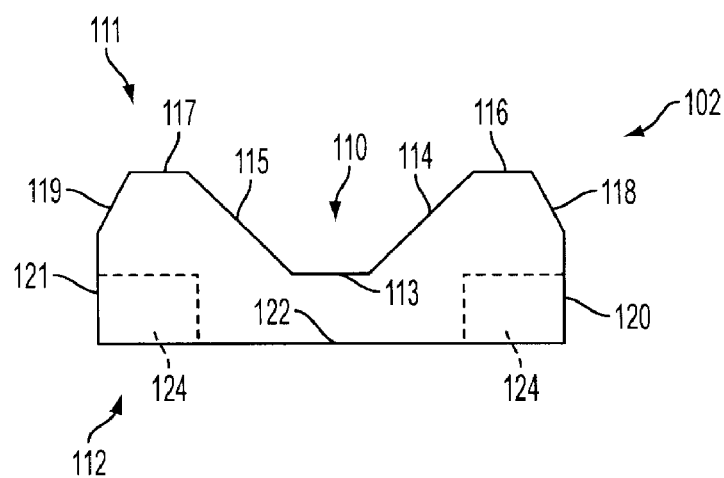
FIG. 11 is a top view of the first clamp member of the tool depicted in FIG. 10.

In another embodiment of the invention, and specifically referring to FIG. 10 through FIG. 11, the tool 100 generally comprises a first clamp member 102, a second clamp member 104 and a third clamp member 106 of similar structure, and means 108 for securing the clamp members 102, 104 and 106 to the boiler wall tubes. In particular, the tool 100 comprises a first clamp member 102 having a recess 110 for engaging a boiler wall tube "T", and a pair of recesses 124 formed in the sides of the first clamp member 102 providing access to the periphery of the boiler wall tube "T". The tool 100 also include a second clamp member 104 and a third clamp member 106. Each one of the clamp members (second clamp member 104 and the third clamp member 106) has a first radius 130 opposite to a second radius 132, wherein the radiuses 130 and 132 have different dimensions. The tool 100 also includes means 108 for securing the first clamp member 102 to one side of the boiler wall tubes "T" and securing the second clamp member 104 and the third clamp member 106 to the opposite side of the boiler wall tubes "T".

The first clamp member 102 has a single recess 110 for engaging a single boiler wall tube. As with the first clamp member 12, described above, the first clamp member 102 may be described as having a length (longitudinal) longer than the width (lateral). Along the front or face 111 of the first clamp member 102, the recess 110 is oriented parallel to the length of the first clamp member 102, with the recess 110 present along the length of the first clamp member 102 except for the interruption due to the presence of the pair of recesses 124 formed in the side of the first clamp member 102. The rear 112 of the first clamp member 102 is relatively flat except for the interruption of the pair of recesses 124 formed in the sides of the first clamp member 102.

The first clamp member 102 may be described as having a front 111 and a rear 112, wherein the recess 110 is formed in the front 111 of the first clamp member 102. The recess 110 comprises a flat front surface 113 intermediately disposed between a pair of inclined surfaces 114 and 115, respectively, and with each terminating at a flat surface 116 and 117, respectively. The flat surface 113 is opposite of and parallel to a flat rear surface 122. The flat rear surface 122 terminates at opposing ends and forms a substantially orthogonal corner with an opposing pair of sidewall surfaces 120 and 121, respectively. Inclined surface 118 is intermediately disposed between the flat surface 116 and the sidewall surface 120, and the opposing inclined surface 119 is intermediately disposed between the flat surface 117 and the sidewall surface 121.

In this embodiment, the second clamp member 104 and the third clamp member 106 each may have a variety of shapes and forms. The clamp members 104 and 106 each have a first radius 130 opposite to a second radius 132, the radiuses 130 and 132 having different dimensions. The radiuses 130 of the clamp members 104 and 106 are arranged so that radiuses 130 have a larger dimension than radiuses 132. The radiuses 130 engage the boiler wall tube "T" and radiuses 132 are exposed. This arrangement provides maximum exposure of the boiler wall tubes "T". Alternatively, it is also envisioned that either the second clamp member 104 or the third clamp member 106, or both clamp members 104 and 106 together, is/are reversible so that radiuses 132 engage the boiler wall tube and the radiuses 130 are exposed, and thus, the larger radiuses 130 are exposed and minimize the area of exposure of the boiler wall tubes "T". However, such an arrangement may be necessary to accommodate boiler wall tubes "T" having a smaller diameter or for imperfections that may render using the larger radius 130 ineffective or impracticable.

Means 108 is envisioned as comprising a pair of threaded bolts 140 inserted through a pair of slots 142 and 144 formed in the first clamp member 102 and slots 146 and 148 formed in the second clamp member 104 and the third clamp member 106, respectively. The slots 142 and 146 and slots 144 and 148 are substantially aligned concentric about an imaginary axes C1-C1 and C2-C2, respectively. As depicted and envisioned in one embodiment, the slots are formed approximately in the center of each respective clamp member 104 and 106. It is also envisioned that the diameter of the slots 142, 144, 146 and 148, respectively, are greater than the diameter of the threaded bolts 140. The additional dimension of the slots allows for the slight offset of one slot relative to the other slot so that the threaded bolts 140 do not have to be aligned perpendicular to the boiler wall tubes "T", thereby allowing for imperfections in the boiler wall tubes "T" or variations in dimension from one wall tube to another wall tube.

Figure 12:
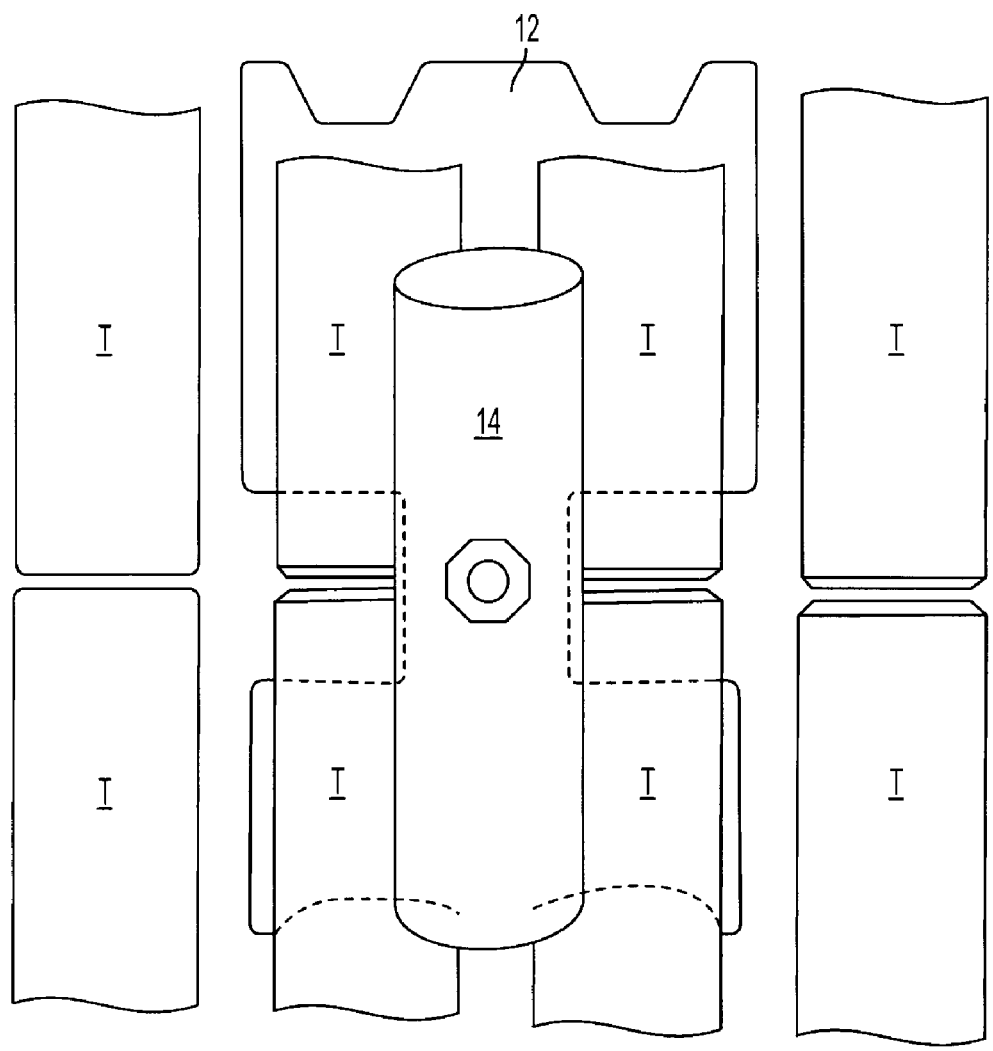
FIG. 12 is a perspective view of one embodiment of the present invention depicting the unobstructed access the user has to the boiler tubes.

Referring now to FIG. 12, a perspective view of the various embodiments of the apparatus is depicted, and is useful for noting that the second clamp member 14 may be configured and coupled to the first clamp member 12 in such a manner that provides maximum access to the boiler tubes "T". In providing minimal obstruction to the user, the boiler tubes "T" may be easily accessed for repair, replacement or maintenance as required or necessary. The boiler tubes "T" are accessible along a vertically elongated path unencumbered by the second clamp member 14 along that path. As such, the embodiments of the invention present an apparatus that increases efficiency and access, and creates a better working environment for the boiler worker.

What is claimed is:

1. A boiler wall tube tool comprising:
   a first clamp member having a front and a rear;
   a first pair of recesses formed at the front and a second pair of recesses formed at the rear;
   a pair of recesses formed in the sides of the first clamp member providing access to the periphery of the boiler wall tubes;
   a second clamp member; and
   means for securing the first clamp member and the second clamp member to the boiler wall tubes.

2. The tool of claim 1, wherein the first clamp member and the second clamp member each have a slot formed for receiving securing means therethrough for securing the first clamp member and the second clamp member to the boiler wall tubes.

3. The tool of claim 2, wherein securing means comprises a threaded bolt and a nut, the bolt inserted through the solts and the nut secured to the free end of the bolt projecting from the rear of one of the slots.

4. The Tool of claim 1, wherein the first clamp member is reversible.

5. The tool of claim 1, wherein the second clamp member is reversible.

6. The tool of claim 1, wherein the second clamp member has a first radius opposite to a second radius, the radiuses having different dimensions.

7. The tool of claim 1, wherein the second clamp member has a bell-shaped form having a radius at one portion and a pair of indentations formed at an opposite portion, the second clamp member also having a ridge separating the indentations.

8. The tool of claim 1, wherein the second clamp member has a spherical form with a uniform radius.

9. A boiler wall tube tool comprising:
   a first clamp member having a front and a rear:
   a first pair of recesses formed at the front of the first clamp member, wherein each recess comprises an inner inclined surface, an outer inclined surface and a flat surface intermediately disposed between the inner inclined surface and the outer inclined surface;
   a pair of recesses formed in the sides of the first clamp member providing access to the periphery of at least one boiler wall tube;
   a second pair of recesses formed at the rear of the first clamp member, wherein each recess comprises an inner inclined surface, an outer inclined surface and a flat surface intermediately disposed between the inner inclined surface and the outer inclined surface;

a second clamp member having a first radius opposite to a second radius and a width intermediately disposed between the first radius and the second radius, the radiuses having different dimensions; and means for securing the first clamp member and the second clamp member about a boiler wall.

10. The tool of claim 9, wherein the first clamp member and the second clamp member each have a slot formed for receiving means therethrough for securing the first clamp member and the second clamp member to the boiler wall tubes.

11. The tool of claim 10, wherein securing means comprises a threaded bolt and a nut, the bolt inserted through the slots and the nut secured to the free end of the bolt projecting from the rear of one of the slots.

12. The tool of claim 9, wherein the recesses formed at the front of the first clamp member have different dimensions than the recesses formed at the rear of the first clamp member.

13. The tool of claim 9, wherein the second clamp member is reversible.

* * * * *